United States Patent [19]
Rutherford et al.

[11] Patent Number: 5,779,198
[45] Date of Patent: Jul. 14, 1998

[54] HANGER BRACKET

[75] Inventors: William Rutherford, Islington; Kieron Denz, Belmont North, both of Australia

[73] Assignee: Fioris Pty Limited, Gateshead, Australia

[21] Appl. No.: 367,179

[22] PCT Filed: Feb. 15, 1994

[86] PCT No.: PCT/AU94/00069

§ 371 Date: Dec. 29, 1994

§ 102(e) Date: Dec. 29, 1994

[87] PCT Pub. No.: WO94/19580

PCT Pub. Date: Sep. 1, 1994

[30] Foreign Application Priority Data

Feb. 22, 1993 [AU] Australia ............... PL7434

[51] Int. Cl.$^6$ .............................................. E21F 17/02
[52] U.S. Cl. ..................... 248/58; 248/49; 248/68.1
[58] Field of Search ................... 248/58, 59, 49, 248/60, 65, 68.1, 304, 317, 339, 340, 70, 62, 903

[56] References Cited

U.S. PATENT DOCUMENTS

| | | | |
|---|---|---|---|
| 974,881 | 11/1910 | Hauk | 248/304 |
| 1,670,902 | 5/1928 | Popps . | |
| 2,854,824 | 10/1958 | Curry et al. | 248/339 |
| 3,486,725 | 12/1969 | Hidassy | 248/68.1 |
| 3,493,206 | 2/1970 | Albro | 248/59 |
| 3,612,459 | 10/1971 | Walls | 248/340 |
| 3,687,406 | 8/1972 | Krahe et al. | 248/68.1 |
| 3,866,871 | 2/1975 | Dupuy, Sr. | 248/68.1 |
| 4,032,096 | 6/1977 | Perrault et al. | 248/73 |
| 4,131,257 | 12/1978 | Sterling | 248/68.1 |
| 4,372,510 | 2/1983 | Skypala | 248/58 |
| 4,541,602 | 9/1985 | Potzas | 248/544 |
| 4,871,134 | 10/1989 | Oikawa | 248/903 |
| 5,199,675 | 4/1993 | DeGuchi | 248/59 |
| 5,217,191 | 6/1993 | Smith | 248/55 |

FOREIGN PATENT DOCUMENTS

| | | | |
|---|---|---|---|
| A78421/87 | 3/1988 | Australia . | |
| A20263/88 | 3/1989 | Australia . | |
| 673882 | 4/1990 | Germany | 248/49 |
| A830627 | 3/1960 | United Kingdom . | |
| A098699 | 11/1982 | United Kingdom . | |

*Primary Examiner*—Ramon O. Ramirez
*Assistant Examiner*—Anita M. King
*Attorney, Agent, or Firm*—Darby & Darby

[57] ABSTRACT

A support bracket for use in supporting overhead cables in mines comprising a post having a first end and a second end with means whereby it can be secured to a support. The second end has limbs extending from either side of the second end which constitute support arms of the bracket to support a cable or hose. The support arms being movable from a cable support position to a cable release position when the cable is subjected to a load in excess of a predetermined level and to return the arms to a cable support position when the excess load has been removed.

12 Claims, 7 Drawing Sheets

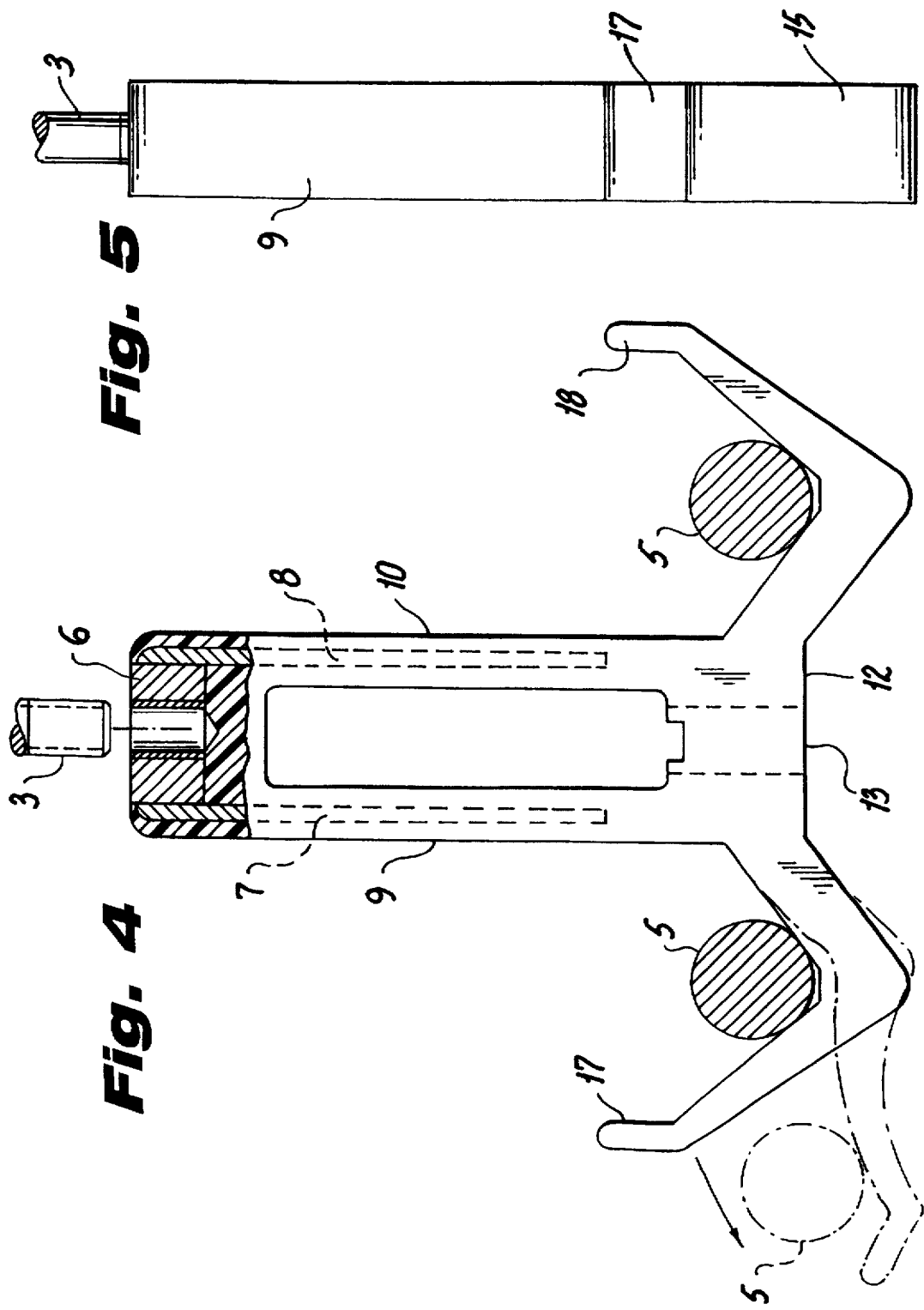

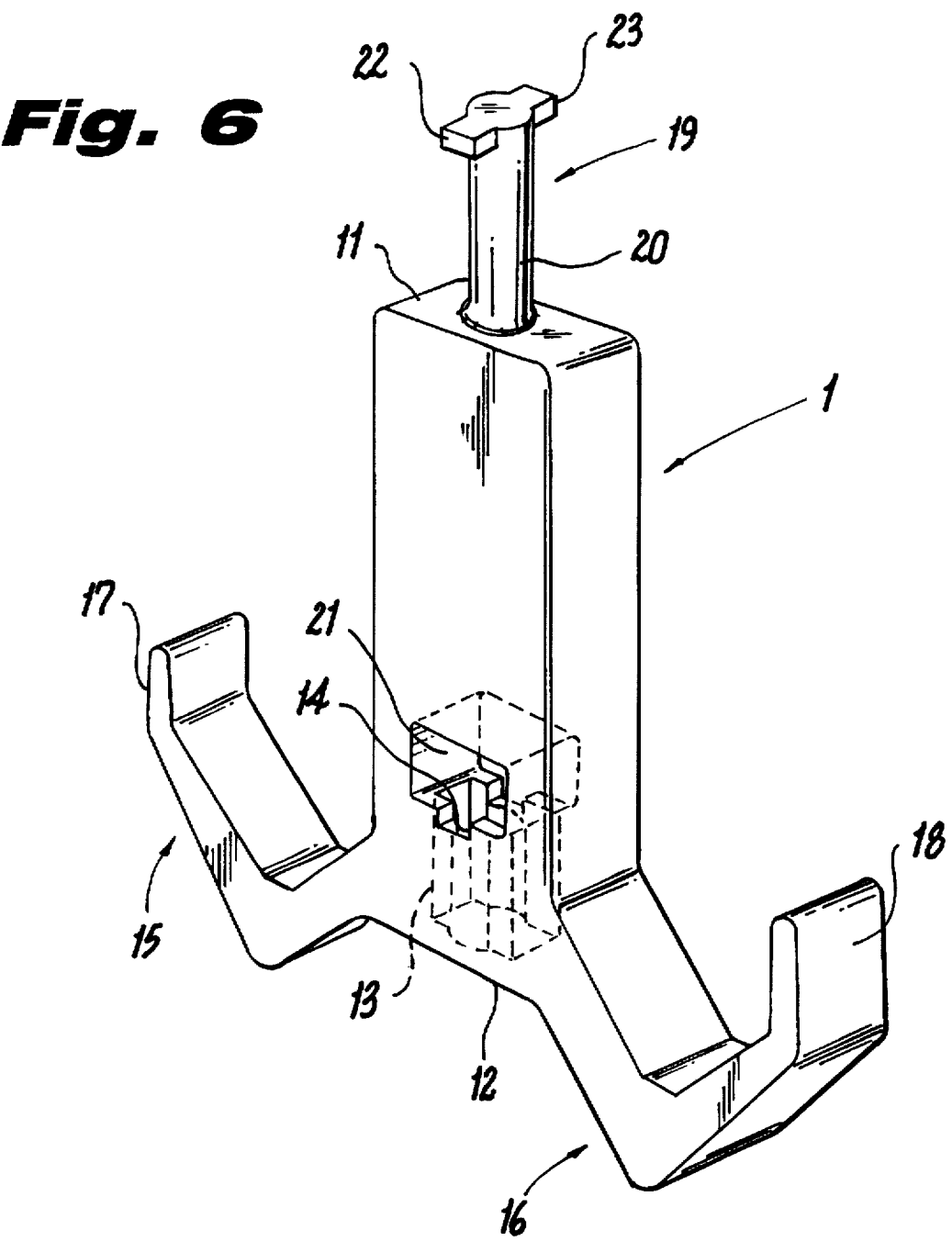

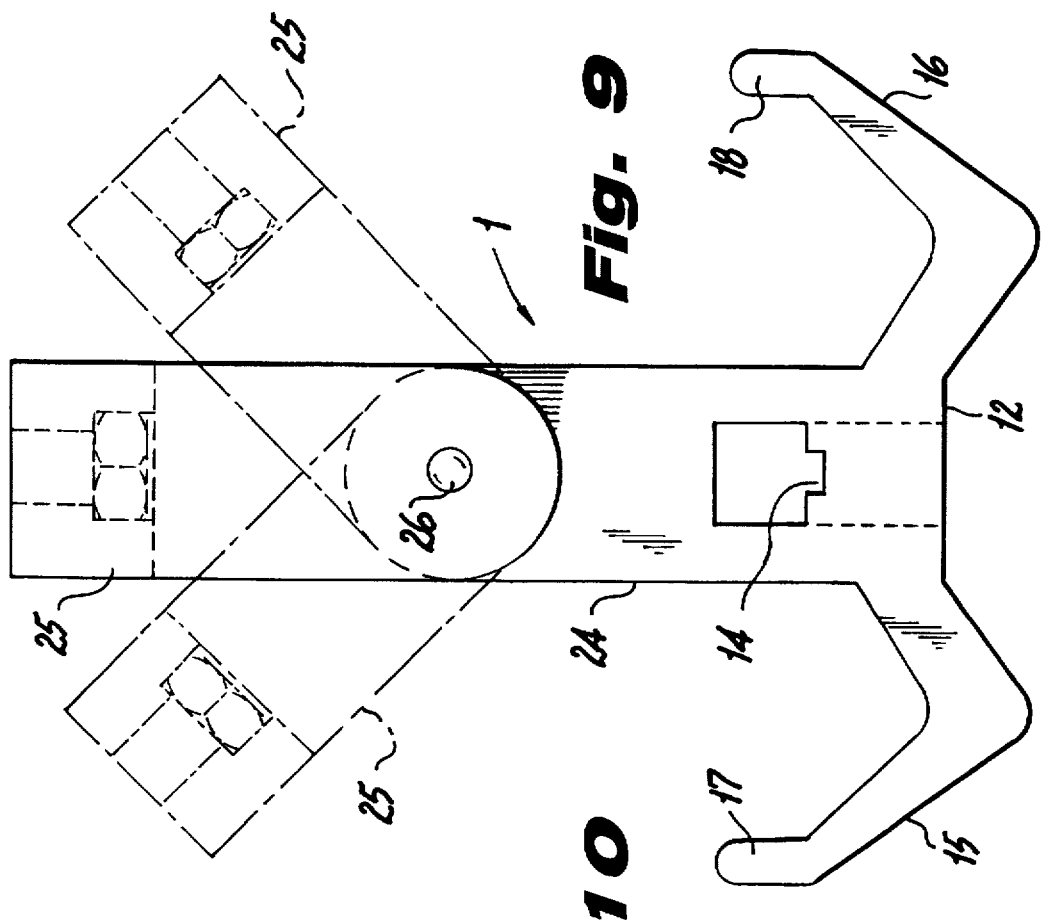
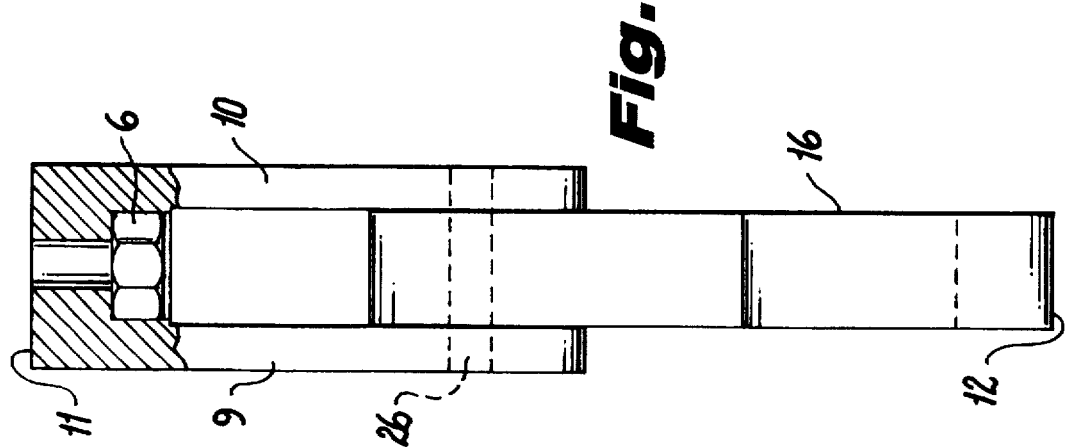

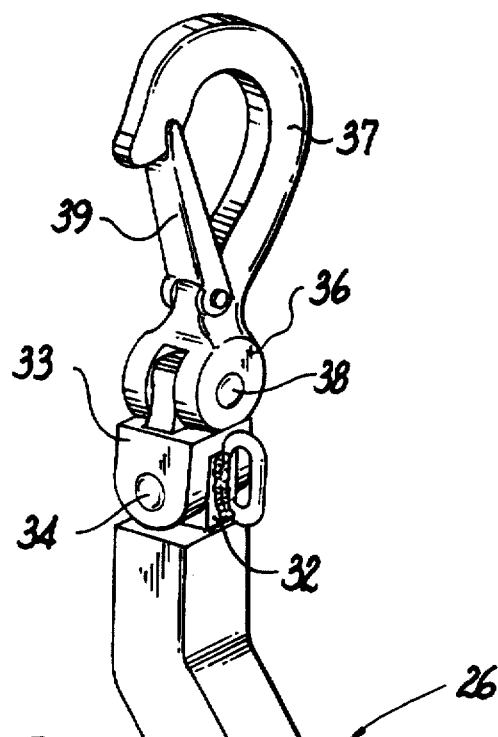
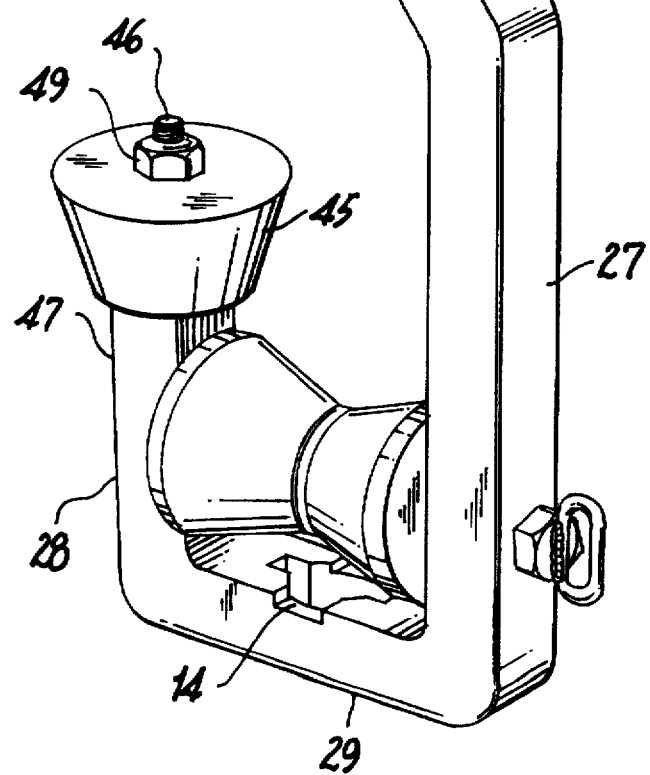
Fig. 11

HANGER BRACKET

This invention relates to support brackets and is particularly applicable to support brackets used in mines.

In modern day mining operations, mining machinery, in many instances, is operated by electric power driven equipment which is supplied with power from overhead cables and ancillary services, e.g. water and air is supplied to the working face from suitably constructed hoses and the like.

In order to allow for the unfetted movement of machinery in mines and for reasons of safety, it is customary to provide overhead support means to support such cables and hoses. The cables and hoses used in mines are of necessity of a robust nature in order to comply with mine safety standards. In consequence they are heavy, difficult to handle and require strongly constructed support brackets to accommodate their weight when supported in an overhead manner in a mine.

Such support brackets have been constructed of steel and a typical support bracket consists of two "J" members with the arms of the long limbs fixed to the opposite sides of a nut in parallel spaced relationship to each other. The short limbs of the "J" members face outwardly in diametrically opposed relationship to each other and each of the long limbs is connected by spaced plates secured to each of the long limbs adjacent the base of the "J" members to define therebetween a slot adapted to receive a hand tool the purpose of which be explained hereafter.

In use the support bracket is screwed by its nut on to an overhead bolt in a mine. A hand tool is inserted in the mentioned slot and is used to tighten the suspension brackets to its corresponding rock bolt.

The mentioned cables and hoses are supported by the support brackets and while they have provided overhead support for such cables, problems have still arisen with mining machinery becoming entangled with overhead cables and bases. If this happens and is not immediately noticed by the machine operator, the cables or hoses are torn from the support brackets which in many instances lead to stress damage to the cables, hoses or brackets or both.

Accidents of this type are dangerous and can lead to serious losses in production time.

The present invention has for its object the provision of a support bracket which avoids problems associated with known brackets, it is of simple construction, protected against corrosion and easy to install.

The invention in its broadest form comprises a support bracket comprising a post having a first end and a second end, the first end having means whereby the bracket can be secured to a support, the second end having at least one arm to support a cable thereon, said support arm being moveable from a cable support position to a cable release position to release said cable when said cable is subjected to a load in excess of a predetermined level and to return said arm to a cable support position when said load has been removed.

In one form of the invention at least the arm is formed of material which in an unstressed condition will enable the arm to support a predetermined load and which under a stressed condition in excess of a predetermined load will permit the arm to flex to an open position to release a cable supported thereon and return the arm to a cable support position after the predetermined load has been removed.

Preferably the support bracket is manufactured from plastic material e.g. polyurethane and preferably the post has reinforcing means embedded therein in such a manner as to provide an area of flexibility within the post.

In a modification, means are provided to connect one or more support brackets to an already mounted bracket in a vertical array.

In a further modification roller members are rotatably mounted on the support bracket to facilitate a change in direction of the cable or hose and the support arm is movable to release a cable supported thereon by tilting said bracket.

Preferred embodiments of the invention will now be described with reference to the accompanying drawings in which:

FIG. 4 is a sectional side elevation view of FIG. 1;

FIG. 5 is an end elevation of the support bracket illustrated in FIG. 4 with a rock bolt engaged in the nut;

FIG. 6 is a perspective view of a modification of the invention;

FIG. 9 is a front sectional view of a further modification of the invention;

FIG. 10 is a right side elevation of the further modification illustrated in FIG. 9;

FIG. 11 is a perspective view of a modification of the invention.

Figure 1:
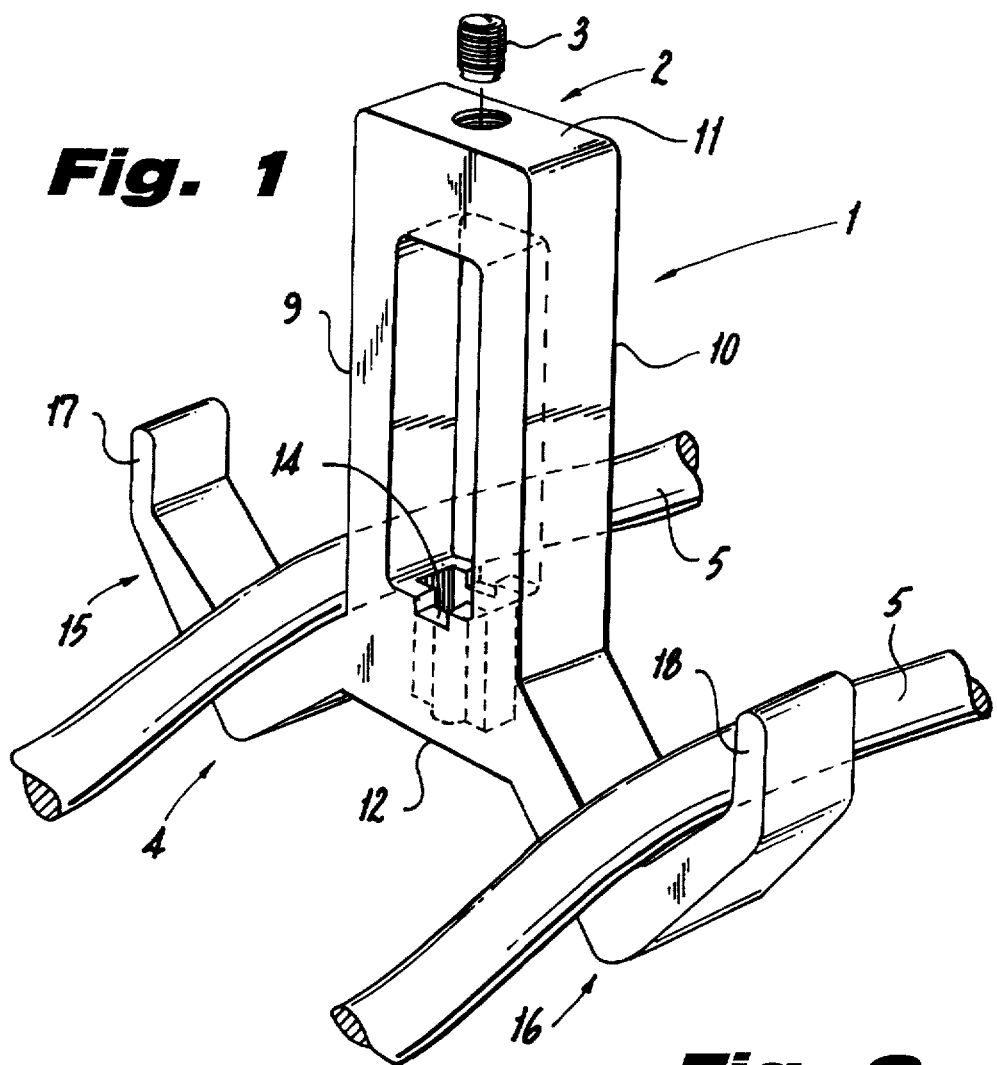
FIG. 1 is a perspective view of a support bracket with cables or hoses supported thereon in accordance with one embodiment of the invention.
Figure 2:
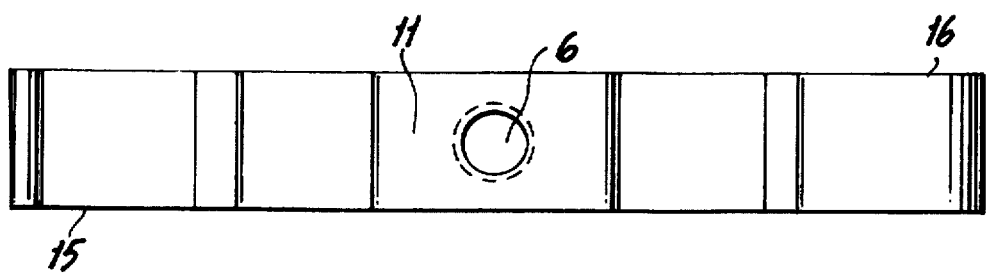
FIG. 2 is a top plan view of FIG. 1.
Figure 3:
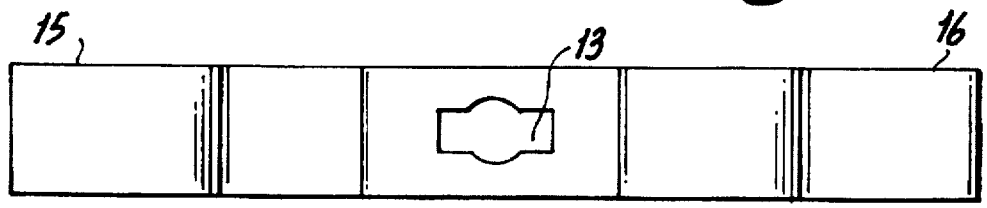
FIG. 3 is a bottom plan view of FIG. 1.

Referring now to FIGS. 1 to 4, the support bracket comprises a central post designated by the reference 1 provided at one end with attachment means 2 whereby it can be secured to a rock bolt 3. Flexible support means 4 at the other end accommodate electric cables or hoses 5

Embedded within the post 1 is a nut 6 having two steel reinforcing members 7 and 8, secured to either side of the nut 6 and extending therefrom in spaced parallel relationship and under load to prevent them from being accidentally withdrawn.

The reinforcing members 7 and 8 are embedded in two spaced vertical limbs 9 and 10 of the central post 1. The limbs 9 and 10 are connected by a cross member 11 at the top in which is embedded the nut 6. As will be apparent the limbs 9 and 10 and the cross member 11 constitute the central post 1. The ends of the limbs 9 and 10 are connected by a cross member 12 having a rectangular shaped vertical bore 13 therein. The cross member 12 is provided with a transverse slot 14 leading to the vertical bore 13, the purpose of which will be explained hereafter.

In the embodiment being described "V" shaped limbs 15 and 16 having upturned ends 17, 18 extend from either side of the cross member 12 and constitute support arms of the bracket to support the cables or hoses 5 as illustrated in FIG. 4.

The reinforcing members 7 and 8 terminate above the cross member 12 as illustrated in FIG. 4 to provide a flex area in the post.

The post 1 and limbs 15, 16 are formed of flexible material which is coupled with the flexible area permits the limbs to distort under excess load to release a cable or hose supported thereon and to return to their normal position when an excess load is removed.

In use a fixing tool (not shown) is inserted in the bore 13 and the bracket screwed on to a rock bolt 3, cables or hoses 5 are then positioned on the support arms as illustrated in FIGS. 1 and 4.

In the case of excess load the arms 15, 16 flex outwardly as illustrated in dotted lines in FIG. 4 thereby permitting the cable or hose 5 to be pulled from the arms without damage to the cable or arms. Once the excess load is removed the arms return to their normal position as illustrated in FIG. 1.

In the embodiment illustrated in FIG. 6 the central post 1 is formed in one piece and embedded with the post is a member 19 having its free end formed as a stud member 20 projecting from the end of the post. The embedded portion of the post is suitably profiled (not shown) to prevent the stud from being accidentally withdrawn from the post under excess load. The stud 20 terminates above a transverse bore 21 to provide a flex area for the post as described with reference to the FIG. 1 embodiment.

The vertical bore 13 terminates in the transverse bore 21 and the transverse slot 14 leads to the vertical bore and the transverse recess 14 slot is provided in the walls of the vertical bore 13 as described with reference to the FIG. 1 embodiment.

The free end of the stud member 20 which projects from the post 1 and is provided with diametrically opposed extensions 22, 23 adapted to lock into the transverse recess 14.

Figure 7:
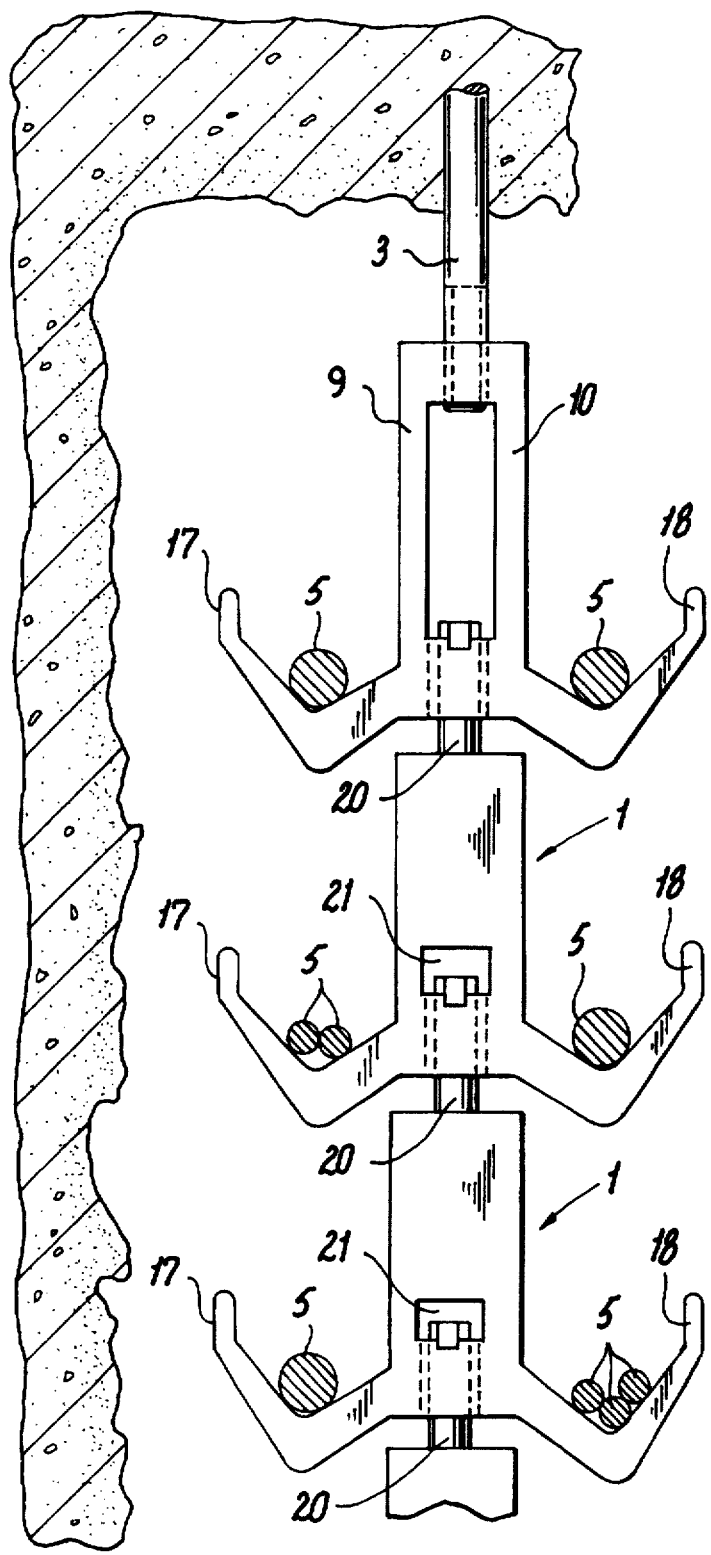
FIG. 7 is a side view of the modification of the invention illustrated in FIG. 6 and showing a number of support brackets connected in vertical array.
Figure 8:
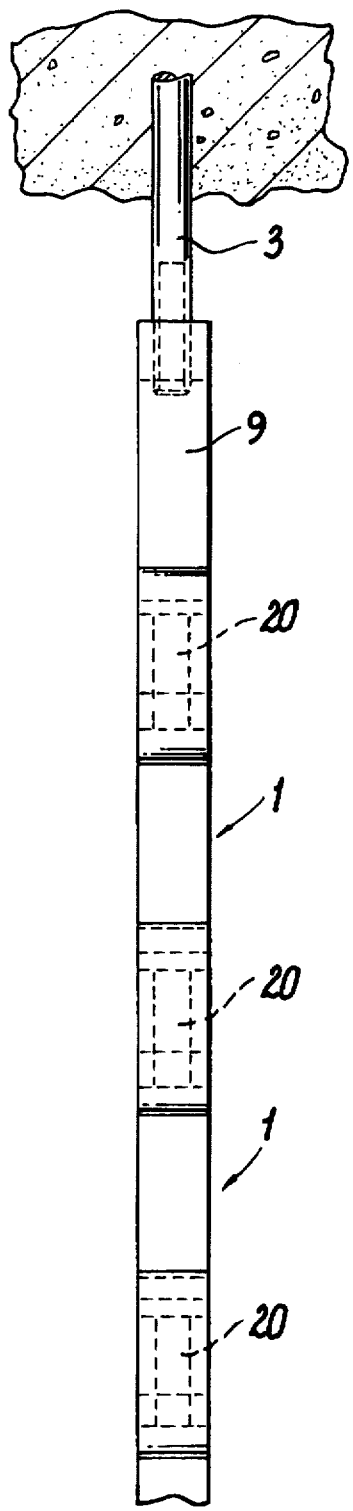
FIG. 8 is an end elevation of FIG. 7.

In use the support bracket illustrated in FIG. 1 is secured to a rock bolt in the manner as described with reference to FIGS. 1 to 5. An additional bracket or brackets are then suspended from the support bracket by engaging the stud members 20 in the respective vertical bores 13 and locking the extensions 22 and 23 in the transverse recess 14 as illustrated in FIGS. 7 and 8.

The embodiment of the invention illustrated in FIGS. 9 and 10 discloses a swivel bracket which is used in those cases where the roof bolt to which it is to be secured is not positioned vertically in the mine roof.

In the case of this embodiment the post 1 is formed of two members 24 and 25 pivotally connected to enable the member 24 to swing relative to the member 25 whereby the member 24 assumes a vertical orientation irrespective angular position of the roof bolt to which it is attached.

As with the support bracket illustrated in FIG. 1, member 25 is formed with two limbs 9 and 10 connected by cross member 11, and embedded in the cross member 11 is a nut 6 whereby the cross member 11 can be secured to a roof bolt.

The member 24 is dimensioned to be a sliding fit between the limbs 9 and 10 and is secured to the member 25 by a transverse pin 25a passing through corresponding bores in the limbs 9 and 10 and member 24.

The arms 15 and 16 are formed on the member 24 in the same manner as described with reference to the embodiment of the invention illustrated in FIGS. 1 to 4 and the parts are identified by the same reference numbers as referred to in that embodiment.

Figure 13:
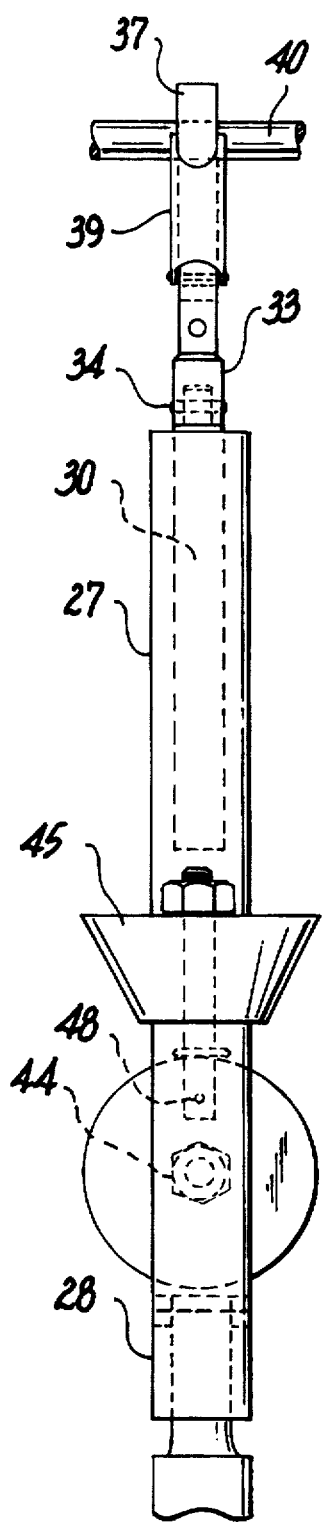
FIG. 13 is an end view of the modification illustrated in FIG. 12.
Figure 12:
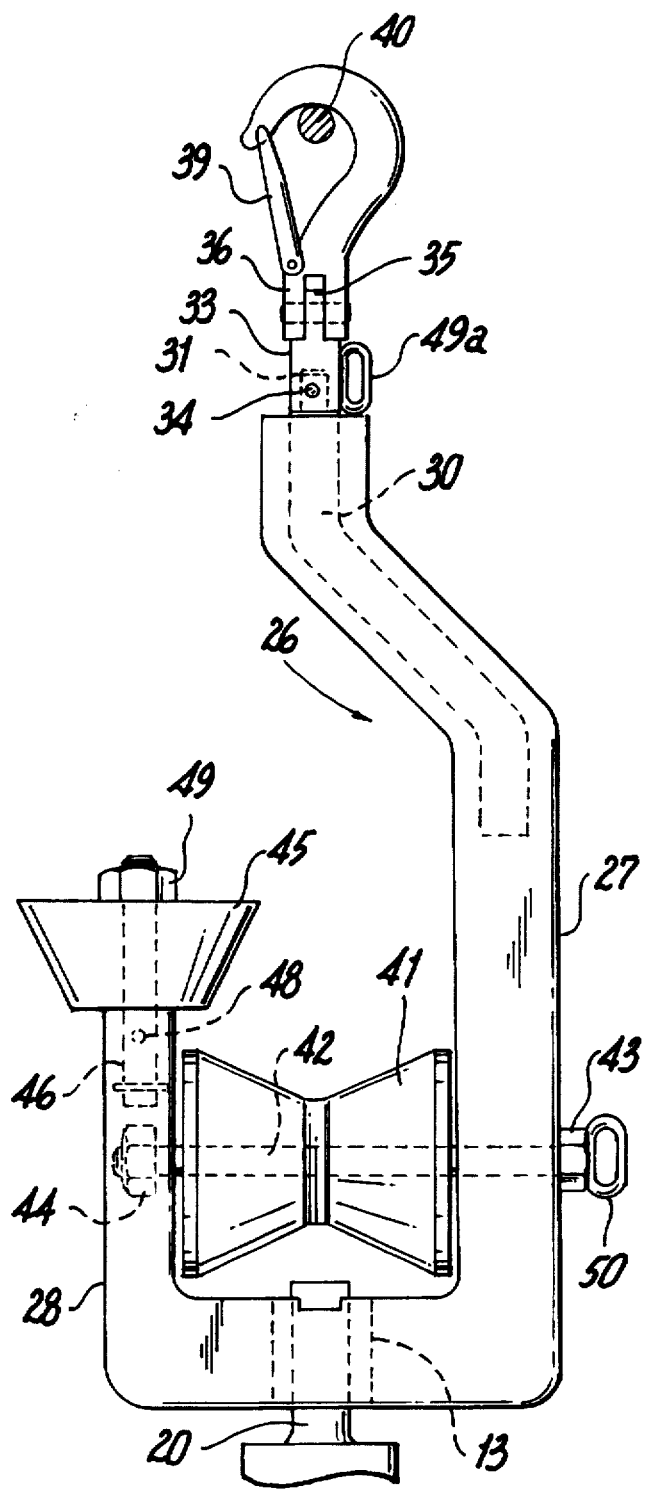
FIG. 12 is a side view of the modification illustrated in FIG. 11.

The embodiment of the invention illustrated in FIGS. 11, 12 and 13 is used where there is a change of direction in the support cable caused by a change in direction of the cable. The support arm is however moveable from a cable support position to a cable release position to release the cable when the cable is subjected to a load in excess of a predetermined level and to return the arm to a cable support position when said excess load is removed.

In this embodiment the support bracket comprises a post which is formed of a "J" shaped member designated generally by the reference 26 having a long limb 27 and a short limb 28 connected to the long limb by a cross-member 29. The free end of the long limb 27 is bent towards the short limb to provide over centre support for the bracket. The long limb 27 is connected to a hook member 37 through a pivotal connection which permits the support bracket to freely swivel relative to the hook member. To this end there is embedded with the long limb is a reinforcing member 30 terminating in a post 31 of smaller diameter than the reinforcing member 30. The post is accommodated in a corresponding slot 32 in a connecting member 33 and is secured thereto by a transverse shear pin 34. The free end of the connecting member is formed into a tongue 35 accommodated in the bifurcated end 36 of hook member 37. The tongue 35 is secured in the bifurcated end 36 by transverse pin 38 thereby forming with the previously described connection a swivel joint.

The hook, 37 provided with a keeper 39 which prevents unintentional disengagement of the hook with an overhead hanger rod 40 secured to the mine roof.

A "V" shaped transverse roller 41 is supported on a transverse axle 42 connected between the long limb 27 and the short limb 28. The axle is conveniently formed of a bolt 43 secured to a nut 44 embedded in the short limb 28.

A truncated cone shaped roller 45 is supported on a vertical axle 46 embedded in the free end 47 of the short limb 28.

The embedded end of the axle is provided with a projecting transverse pin 48 to prevent withdrawal of the axle 46 from the end 47 under excess load and the end of the axle is threaded to accommodate a nut 49 whereby the roller 45 is secured to the axle 46.

Link members 49a and 50 are secured to the head of bolt 43 and the connecting member 33 respectively. The link members are connected by a safety chain (not shown).

The cross-member 29 is provided with a vertical bore 13 having a transverse slot 14 as described with reference to the FIG. 1 embodiment. To accommodate a post 20 of a further bracket to be supported from the cross member 29 as previously described.

In use the bracket is secured to the support rod 40 fixed to the roof of a mine by hook member 37. A cable or hose 5 is supported on roller 41 and guided by roller 45. In the event that a load in excess of a predetermined level is encountered by the cable 5. The "J" member can tilt about its hook and pivotal connection which permits the arm 28 to tilt and so release the cable without damage to the bracket or the cable.

The invention claimed is:

1. A support bracket for a cable or hose to be attached to a support said bracket comprising a post having a first end and a second end, the first end having means whereby the bracket can be secured to the support, the second end having at least one arm to support the cable or hose, said post having a flex area and said arm being formed of flexible material, the flex area in said post co-operating with said arm to permit said arm to move from a cable or hose support position to a cable or hose release position when said cable or hose is subject to a load in excess of a predetermined level and return said arm to a cable or hose support position when said load has been removed.

2. The support bracket as claimed in claim 1 wherein the means at said first end to secure the bracket to the support comprises a threaded bore adapted to be secured to a roof bolt or rod.

3. The support bracket as claimed in claim 1 wherein the support bracket has reinforcing means embedded therein and so located to provide an area of flexibility within the post.

4. The support bracket as claimed in claim 1 wherein the post is formed of upper and lower members pivotally connected together whereby the lower member can pivot with respect to said upper member to assume a vertical position irrespective of the angular mounting of said upper member.

5. The support bracket as claimed in claim 4 wherein the upper member has a cross member at said first end with two spaced limbs depending therefrom, the lower member being a sliding fit between said limbs and being connected thereby by a transverse pin.

6. The support bracket as claimed in claim 1 wherein said bracket is formed of a "J" shaped member having a long limb and a short limb connected by a cross member at said second end, the long limb being bent towards said short limb to provide an over centre support for bracket, the free end of said J member being pivotally connected to a hook by a shear pin, said hook constituting said means whereby said bracket can be secured to a support, a "V" shaped roller supported on a transverse axle connected between said long limb and said short limb and a truncated cone shaped roller supported on a vertical axle mounted in the free end of the short limb.

7. The support bracket as claimed in claim 6 wherein said cross member includes means whereby a further support bracket can be suspended therefrom.

8. The support bracket as claimed 7 wherein said means to suspend a further support bracket comprises a vertical bore in said cross member having a transverse slot across the top walls thereafter adapted to engage with an interlock with a post extending from the first end of a second bracket to be suspended from said bracket.

9. The support bracket as claimed in claim 1 wherein said long limb is connected to said hook by a safety chain to limit the fall of said J member in the event that the shear pin is broken by excess load.

10. The support bracket as claimed in claim 1 wherein said post is formed of two spaced limbs connected by upper and lower cross members, the upper cross member having said securing means at said first end and whereby the post can be secured to the support, the lower cross member forming said second end and having arms extending from each end of said cross member to support the cable or hose thereon.

11. The support bracket as claimed in claim 10 wherein the lower cross member includes means whereby a further support bracket can be suspended therefrom.

12. The support bracket as claimed in claim 11 wherein the means at said first end to secure said bracket to said support comprises a member having a free end, said post having means at the free end thereof to interengage with a transverse slot extending across top walls of a centrally positioned vertical bore in said second end where said member is inserted in a previously mounted bracket to suspend a second bracket therefrom.

* * * * *